United States Patent
Saito

(10) Patent No.: US 7,764,923 B2
(45) Date of Patent: Jul. 27, 2010

(54) MATERIAL PROCESSING APPARATUS AND METHOD FOR GRADING MATERIAL

(75) Inventor: Teruka Saito, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 707 days.

(21) Appl. No.: 11/223,935

(22) Filed: Sep. 13, 2005

(65) Prior Publication Data

US 2006/0194188 A1    Aug. 31, 2006

(30) Foreign Application Priority Data

Feb. 28, 2005    (JP)    ............................. 2005-052481

(51) Int. Cl.
   *G09B 7/00*    (2006.01)
(52) U.S. Cl. ........................................ 434/353; 434/354
(58) Field of Classification Search .......... 434/353–354
   See application file for complete search history.

(56) References Cited

U.S. PATENT DOCUMENTS

| | | | |
|---|---|---|---|
| 6,442,370 B1* | 8/2002 | Driscoll et al. | 434/350 |
| 6,493,536 B1* | 12/2002 | Jongsma et al. | 434/353 |
| 6,684,052 B2* | 1/2004 | Kucinski et al. | 434/359 |
| 2003/0180703 A1* | 9/2003 | Yates et al. | 434/353 |

FOREIGN PATENT DOCUMENTS

JP    A-6-266278    9/1994

\* cited by examiner

*Primary Examiner*—Cameron Saadat
(74) *Attorney, Agent, or Firm*—Oliff & Berridge, PLC

(57) ABSTRACT

A material processing apparatus has a reader unit, an information extracting unit and a grade determination unit. The reader unit reads a material. The information extracting unit extracts information from the material, the information having information written by a user and information printed on the material in advance. The grade determination unit grades the information written by the user based on the information printed on the material in advance.

19 Claims, 12 Drawing Sheets

FIG. 3

| SCIENCE, 5TH GRADE | 1. CHANGES IN WEATHER AND TEMPERATURE | GRADE, CLASS | NAME | | POINTS |

5 POINTS EACH

5 POINTS EACH

10 POINTS EACH

EXAMINATION PAPER INFORMATION

| ARITHMETIC-3-GRAPH | | | |
|---|---|---|---|
| NUMBER OF COLUMNS | 3 | | |
| COORDINATES OF COLUMN COMPOSITION BLOCK | (10,100) - (350,780), (360,100) - (700,780), (710,100) - (1050,780) | | |
| VERTICAL WRITING/ HORIZONTAL WRITING | HORIZONTAL WRITING | | |
| ORDER | QUESTION | ALLOTMENT OF POINTS | JUDGMENT |
| 1 | QUESTION 1-1 | 3 | |
| 2 | QUESTION 1-2 | 3 | |
| 3 | QUESTION 2 | 10 | |
| 4 | QUESTION 3-1 | 5 | |
| ·· | ·· | ·· | ·· |

TEACHING MATERIAL FOR EDUCATION

COLUMN COMPOSITION BLOCK

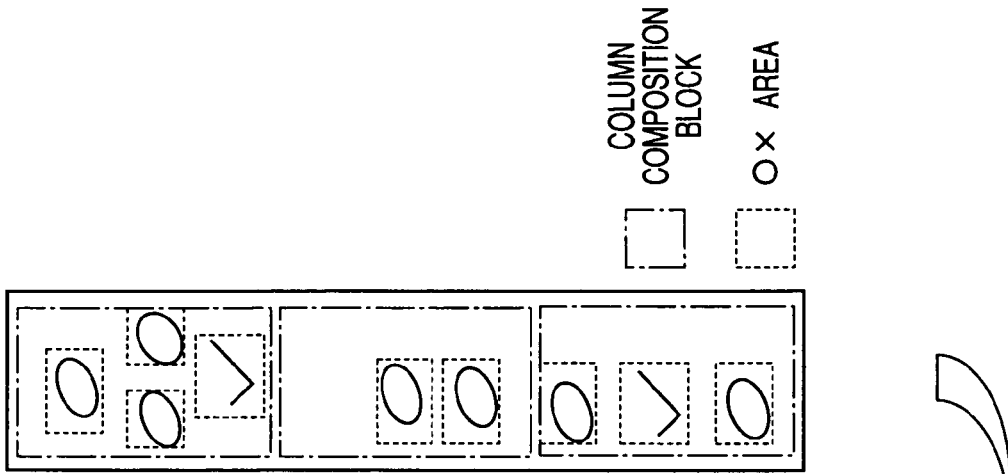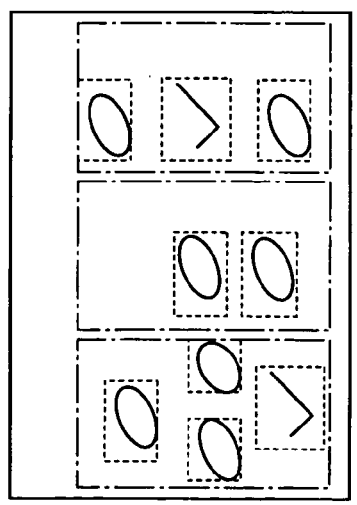

RESULT OF ORDERING

MANAGEMENT TABLE OF JUDGMENT PATTERN AREAS

| X-COORDINATE | Y-COORDINATE | RESULT OF JUDGMENT | X-COORDINATE AFTER CONVERSION | Y-COORDINATE AFTER CONVERSION | ORDER |
|---|---|---|---|---|---|
| 350 | 280 | ○ | 80 | 1750 | 6 |
| 730 | 130 | ○ | 50 | 2080 | 7 |
| .. | .. | .. | .. | .. | .. |

FIG. 10B

EXAMINATION PAPER INFORMATION

| ARITHMETIC-3-GRAPH | | | |
|---|---|---|---|
| NUMBER OF COLUMNS | 3 | | |
| COORDINATES OF COLUMN COMPOSITION BLOCK | (10,100) - (350,780), (360,100) - (700,780), (710,100) - (1050,780) | | |
| VERTICAL WRITING/ HORIZONTAL WRITING | HORIZONTAL WRITING | | |
| ORDER | QUESTION | ALLOTMENT OF POINTS | JUDGMENT |
| 1 | QUESTION 1-1 | 3 | ○ |
| 2 | QUESTION 1-2 | 3 | ○ |
| 3 | QUESTION 2 | 10 | ○ |
| 4 | QUESTION 3-1 | 5 | × |
| .. | .. | .. | .. |

FIG. 10A

MANAGEMENT TABLE OF JUDGMENT PATTERN AREAS (EXTRACT)

| RESULT OF JUDGMENT | ORDER |
|---|---|
| ○ | 6 |
| ○ | 7 |
| ○ | 1 |
| × | 4 |
| ○ | 5 |
| × | 8 |
| ○ | 2 |
| ○ | 3 |
| ○ | 9 |

FIG. 11
| QUESTION NUMBER | ○ × | SCORE |
|---|---|---|
| 1 | ○ | 5 |
| 2 | ○ | 10 |
| 3 | × | 0 |
|  |  |  |
| N | ○ | 10 |
FIG. 12A
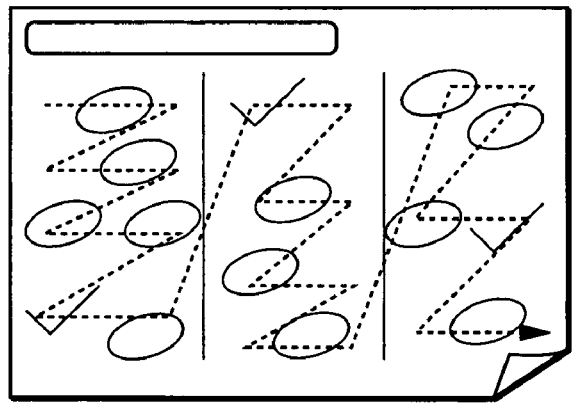
ORDER FOR ARITHMETIC OR SCIENCE
FIG. 12B
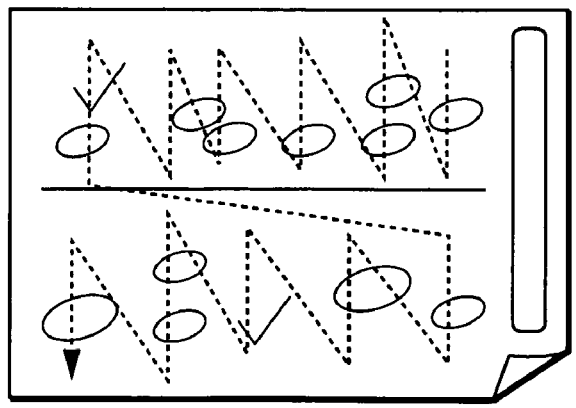
ORDER FOR JAPANESE OR SOCIAL STUDIES

MATERIAL PROCESSING APPARATUS AND METHOD FOR GRADING MATERIAL

BACKGROUND OF THE INVENTION

1. Field of the Invention

This invention relates to a material processing apparatus, a material processing method and a storage medium storing a material processing program.

2. Description of the Related Art

Generally, it is difficult to process a material when the material has information depending on an occasion. For example, there is a case when a student writes down answers on an examination material. The examination material has some information, for example, a question, an answer space, a score defined by a teacher for each question in advance, an answer written by the student. In this case, the teacher reads the answer written by the student, checks it, scores each question, and then scores the examination. Meanwhile, labor saving in the scoring processing for the examination material is highly demanded. Also, there is another case when we survey by a questionnaire or the like.

Automatically scoring the answer on the examination material for education by a PC (see, for example, JP-A-6-266278) is known. However, it is not suitable because some dedicated devices such as a scoring stand and a scoring pen are required in the scoring processing. The dedicated devices can cause complication of the overall structure of the system, increase in the cost and the like. Moreover, as the dedicated devices are required, the applicable examination materials are limited.

On the other hand, educational institutions generally install and use PCs, copy machines, or a so-called multifunction machine, which integrally includes scanner function, printer function, network communication function and the like. Then, the content of the answer on the examination material is extracted from image data, and a person who wrote the answer is specified by an OCR (optical character reader) technique or the like. Then, the result of the score totaling and the result of specifying the answerer are associated with each other, to acquire the result of automatic scoring similar to the result disclosed in the above-described JP-A-6-266278.

However, as described above, it is necessary to confirm the correspondence between the position of the answer space on the material and the position where the judgment on whether the answer written in the answer space is right or wrong is written.

Also, it is know that the correspondence between the position of the answer space and the position where the judgment is written may be made by using coordinate values.

However, to make the correspondence using coordinate values, processing to input the coordinate values or processing to automatically calculate the coordinate values is necessary. Therefore, the operation for the processing to input the coordinate values becomes very complicated, and operation errors may occur. The processing to automatically calculate the coordinate values is not necessarily preferable in consideration of the processing load and the like.

SUMMARY

Thus, this invention has been made in view of the above circumstances and provides a material processing apparatus, a material processing method and a storage medium storing a material processing program.

A material processing apparatus has a reader unit, an information extracting unit and a grade determination unit. The reader unit reads a material. The information extracting unit extracts information from the material, the information having information written by a user and information printed on the material in advance. The grade determination unit grades the information written by the user based on the information printed on the material in advance.

BRIEF DESCRIPTION OF THE DRAWINGS

Embodiments of the invention will be described in detail based on the following figures, wherein:

FIG. 3 is an explanatory view showing a specific example of a teaching material for education;

FIGS. 8A to 8C are explanatory views showing an example of ordering processing to order the contents of written judgments (part 1);

FIGS. 10A and 10B are explanatory views showing an example of ordering processing to order the contents of written judgments (part 3);

FIG. 11 is an explanatory view showing a specific example of the result of scoring for each question;

FIGS. 12A and 12B are explanatory views showing specific examples of the relation between the type of teaching material for education and the mode of ordering.

DETAILED DESCRIPTION OF THE INVENTION

According to an aspect of the present invention, a material processing apparatus, a material processing method and a storage medium storing a material processing program will be described with reference to the drawings. Hereinafter, a material processing apparatus, a material processing method, and a storage medium storing a material processing program are described as an example when the apparatus, method and storage medium are used in the field of education. However, the present invention is not limited to the education filed.

Figure 1:
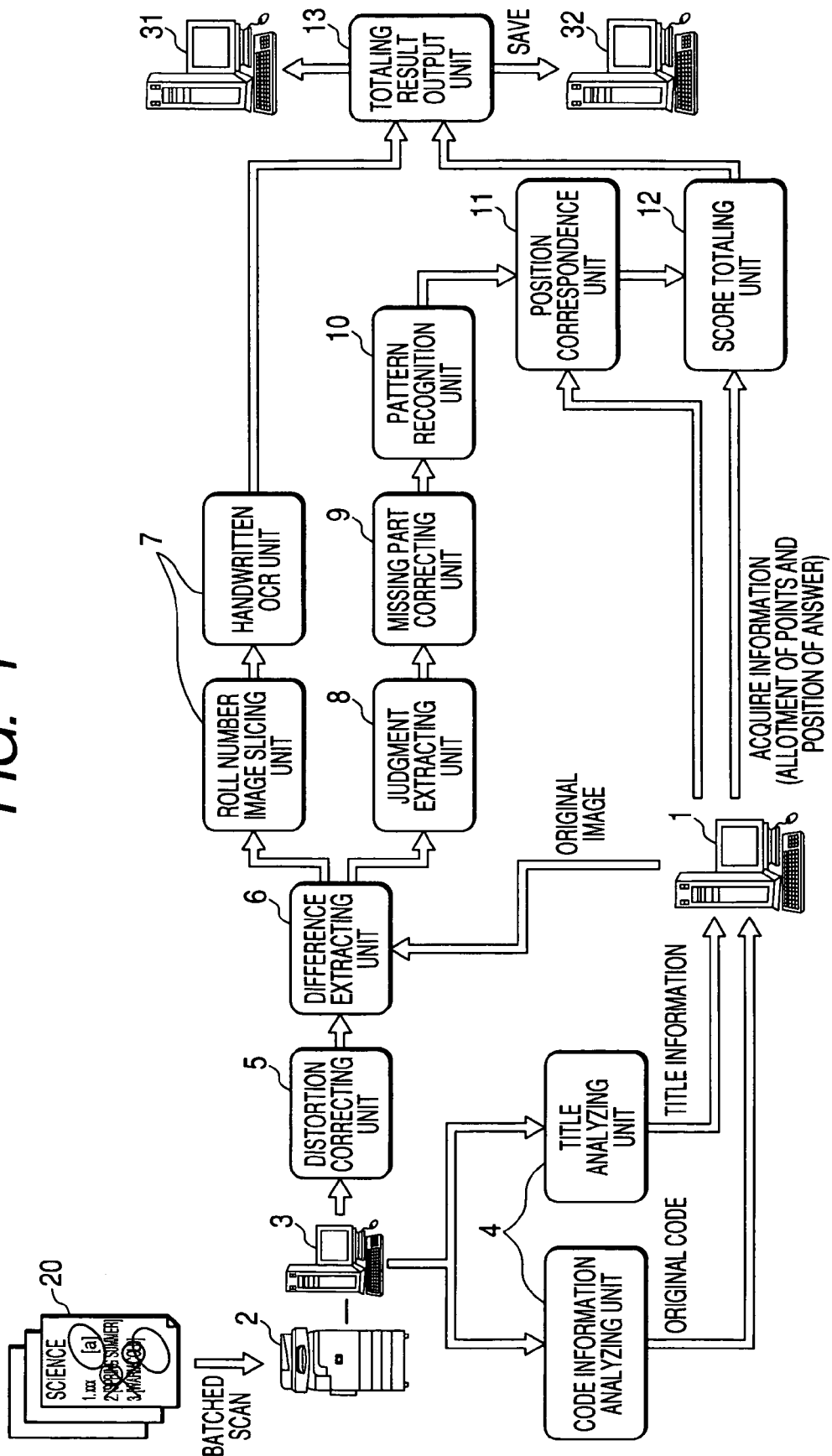
FIG. 1 is a block diagram showing an exemplary schematic configuration of a teaching material processing apparatus according to an embodiment of this invention.
Figure 2:
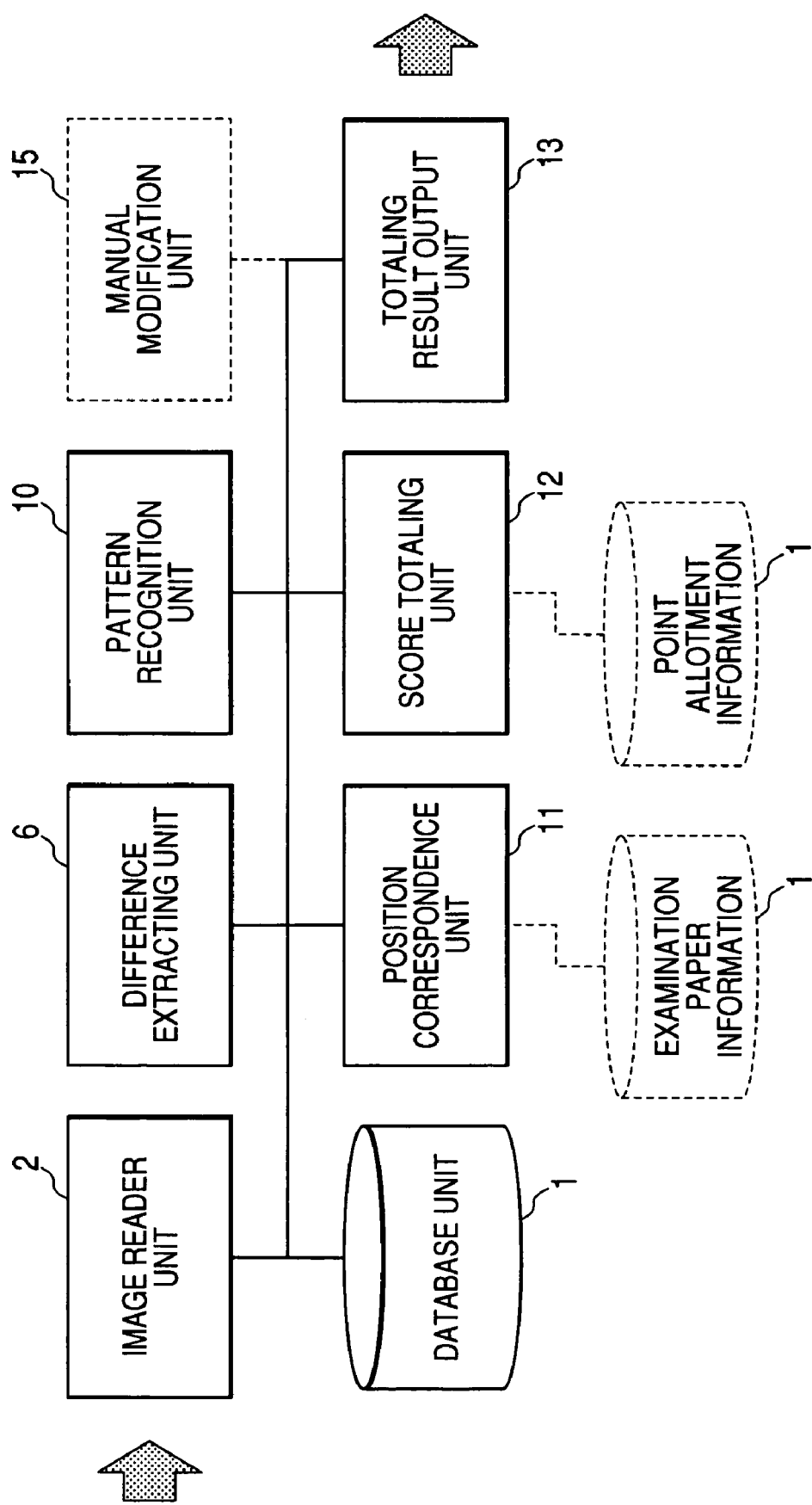
FIG. 2 is a block diagram showing an exemplary configuration of essential parts of the teaching material processing apparatus shown in FIG. 1.

First, a schematic configuration of a teaching material processing apparatus will be described. FIG. 1 is a block diagram showing an exemplary schematic configuration of a teaching material processing apparatus according to an embodiment of this invention. FIG. 2 is a block diagram showing an exemplary functional configuration of essential parts of the apparatus.

As shown in FIGS. 1 and 2, the teaching material processing apparatus described here includes a database unit 1, an image reader unit 2, an image data analyzing unit 3, a teaching material distinguishing unit 4, a distortion correcting unit 5, a difference extracting unit 6, an answerer extracting unit 7, a judgment extracting unit 8, a missing part correcting unit 9, a pattern recognition unit 10, a position correspondence unit 11, a score totaling unit 12, and a totaling result output unit 13. The apparatus may further include a manual modification unit 15.

The database unit 1 holds and accumulates electronic data about teaching materials for education.

The teaching materials for education will now be described. FIG. 3 is an explanatory view showing a specific example of a teaching material for education. As shown in FIG. 3, a teaching material for education 20 contains plural questions and answer spaces 21 for the individual questions. Specifically, the teaching material for education 20 is equivalent to an examination sheet, an exercise sheet or the like used in educational institutions. However, question texts need not be necessarily described on the teaching material for education 20.

The teaching material for education 20 also contains an identification information space 22 for identifying and specifying the teaching material for education, and an answerer information space 23 related to a person who writes an answer to the answer space 21. In the identification information space 22, for example, the subject, title, applicable grade and the like of the teaching material for education are described in advance. However, in addition to or apart from these descriptions, code information for identifying the teaching material for education 20 may be embedded. The code information may be embedded by utilizing known techniques. As a specific example of these known techniques, digital information may be embedded in a halftone image by changing the form (position, shape and the like) of pixels constituting a single line screen or a dot screen as a gradational expression, like "iTone" (trademark). On the other hand, in the answerer information space 23, the class, roll number, name and the like of the answerer are written.

The data format of the electronic data about the teaching material for education 20 is not particularly limited as long as the layout of the answer spaces 21, the identification information space 22 and the like on the teaching material for education 20 can be specified and the electronic data can be held and accumulated in the database unit 1. Specifically, for example, image data of raster format acquired by image reading by the image reader unit 2, which will be described later, may be stored and held as the electronic data about the teaching material for education 20.

Figures 4A, 4B:
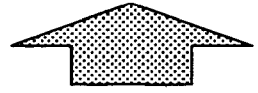
FIGS. 4A and 4B are explanatory views showing a specific example of examination paper information.

However, it is assumed that the electronic data of the teaching material for education 20 contains examination paper information about the teaching material for education 20. FIGS. 4A and 4B are explanatory views showing a specific example of examination paper information. The examination paper information is, for each teaching material for education 20, the information to specify each question number, the layout of question texts and answer spaces 21, and the allotment of points to the answer spaces 21 for the individual questions, on each teaching material for education 20. The information specifying the layout may be, for example, column composition (number of columns, dividing position and the like) information, or horizontal writing/vertical writing information. The information specifying the allotment of points may be point allotment information that represents allotment of points to each of the answer spaces 21 on the teaching material for education 20. The allotment of points may be different or uniform among the answer spaces 21.

Referring again to FIGS. 1 and 2, the image reader unit 2 performs image reading on a teaching material for education 20 that is a reading subject, by using a known optical image reading technique, and thus acquires image data from the teaching material for education 20. That is, the image reader unit 2 functions as a reader unit in this invention. The teaching material for education 20 that is a reading subject may be a teaching material on which answers in the answer spaces 21, a name or the like in the answerer information space 23 and judgment on whether the answers are right or wrong (specifically, for example, patterns such as "O" or "x") are written. Also, to store and hold electronic data in the database unit 1, teaching materials on which the spaces 21 and 23 are not filled (hereinafter referred to as "originals") can be reading subjects at the image reader unit 2.

The image data analyzing unit 3 performs analysis processing on the image data acquired by the image reader unit 2. The analysis processing includes layout analysis, character/pattern separation, character recognition, code information recognition, pattern processing, color component recognition and the like. Each of these can be realized by utilizing known image processing techniques and therefore will not be described in detail here.

The teaching material distinguishing unit 4 includes at least one of a title analyzing unit and a code information analyzing unit. The teaching material distinguishing unit 4 identifies and specifies the teaching material that is the source of the image data acquired by the image reader unit 2, on the basis of the result of the analysis processing by the image data analyzing unit 3, particularly the result of one of title analysis by the title analyzing unit and code analysis by the code information analyzing unit with respect to the identification information space 22. In this processing, the teaching material distinguishing unit 4 refers to the teaching materials for education the electronic data of which are held and accumulated in the database unit 1, and when there is no corresponding electronic data held and accumulated in the database unit 1, the teaching material distinguishing unit 4 judges that it is an identification/specification error of the teaching material for education.

The distortion correcting unit 5 corrects image distortion in the image data acquired by the image reader unit 2. The correction of image distortion may be inclination correction, enlargement or reduction correction in the main scanning direction or sub scanning direction, and so on. Each of these can be realized by utilizing known image processing techniques and therefore will not be described in detail here.

The difference extracting unit 6 compares the image data acquired by the image reader unit 2 and having its image distortion corrected by the distortion correcting unit 5 with the electronic data in the database unit 1 that is a comparison subject of the image data, on the basis of the result of the identification and specification of the teaching material for education by the teaching material distinguishing unit 4, and thus extracts the difference between these data. That is, the difference extracting unit 6 functions as an additionally written information extracting unit according to an embodiment of the invention. The technique of difference extraction processing itself can be realized by utilizing a known image processing technique and therefore will not be described in detail here.

The answerer extracting unit 7 includes at least one of and preferably both of a roll number information slicing unit and a handwritten OCR (optical character reader) unit. The answerer extracting unit 7 extracts answerer information in the teaching material for education that is the reading subject in the image reader unit 2, on the basis of the result of the analysis processing by the image data analyzing unit 3 and through character information extraction from the difference in the answerer information space 23 by the roll number information slicing unit or character recognition processing by the handwritten OCR unit or the like with respect to the difference in the answerer information space 23, of the difference extracted by the difference extracting unit 6. The answerer information may be information to identify the person who wrote the answer, including the class, roll number, name and the like of the person who wrote the answer.

The judgment extracting unit 8 extracts the content of a written judgment further from the difference extracted by the difference extracting unit 6, on the basis of the result of the analysis processing by the image data analyzing unit 3. In this extraction of the content of a written judgment, for example, the content of a written judgment with respect to a predetermined color component may be extracted through color component recognition processing on the result of the extraction by the difference extracting unit 6. Typically, judgments are written in red.

The missing part correcting unit 9 performs missing part correction processing on the result of the extraction by the judgment extracting unit 8. The missing part correction processing is the processing to connect extracted segments and thus eliminate the missing part between the extracted segments.

The pattern recognition unit 10 performs shape recognition of the content of the written judgment extracted by the judgment extracting unit 8 and having its missing part corrected by the missing part correcting unit 9, and thus recognizes the content of the written judgment. The shape recognition may be performed, for example, by pattern matching with the pattern "O" or "x". In short, the pattern recognition unit 10 recognizes whether the content of a written judgment is "right (O)" or "wrong (x)". That is, the pattern recognition unit 10 functions as a judgment recognition unit according to an embodiment of the invention.

The position correspondence unit 11 orders the content of the written judgment as the result of the recognition by the pattern recognition unit 10 and makes correspondence between the result of the recognition and each question on the teaching material for education 20. That is, the position correspondence unit 11 functions as an additional writing order calculating unit according to an embodiment of the invention. Using the result of the correspondence made by this position correspondence unit 11, the result of the recognition ("O" or "x") by the pattern recognition unit 10, and the examination paper information including the point allotment information stored and held in the database unit 1, it is possible to perform score totaling processing for the teaching material for education 20, which will be described later.

The score totaling unit 12 performs score totaling of the judgment written on the teaching material for education on which image reading is performed by the image reader unit 2, on the basis of the result of the recognition of the content of the written judgment by the pattern recognition unit 10, the result of the recognition of the position where the judgment is written by the position correspondence unit 11 and the point allotment information about each answer space 21 on the teaching material for education included in the electronic data of the teaching material for education held and accumulated in the database unit 1. That is, the score totaling unit 12 functions as a score totaling unit according to an embodiment of the invention.

The totaling result output unit 13 outputs the result of the score totaling by the score totaling unit 12 in association with the answerer information extracted by the answerer extracting unit 7. It functions as a totaling result output unit according to an embodiment of the invention. The destination of the output from the totaling result output unit 13 may be a database device 31 or file server device 32 that is connected to the teaching material processing apparatus and that manages the result of the score totaling for the teaching material for education.

The manual modification unit 15 is for the user of the teaching material processing apparatus to modify the results of the processing by the position correspondence unit 11 and the score totaling unit 12, when necessary. This manual modification unit 15 is not essential and therefore need not be provided.

Of the above-described units 1 to 15, the image reader unit 2 may be realized by using a copy machine, multifunction machine or a scanner device having the function of the image reader unit. In this case, image reading on plural teaching materials for education can be continuously performed when an automatic document feeder (ADF) is additionally provided.

The units 1 and 3 to 15 other than the image reader unit 2 may be realized by using a computer device that realizes an information storage processing function, an image processing function, an arithmetic processing function and the like by executing a predetermined program, for example, like a PC. In this case, the predetermined program necessary for realizing the units 1 and 3 to 15 may be installed in the PC in advance. However, the predetermined program may also be stored in a computer-readable storage medium and thus provided, or it may be distributed through wired or wireless communication, instead of being installed in advance. In short, the teaching material processing apparatus of the above-described configuration can also be realized by a teaching material processing program that causes a computer connected with an image reader unit to function as the teaching material processing apparatus.

Figure 5:
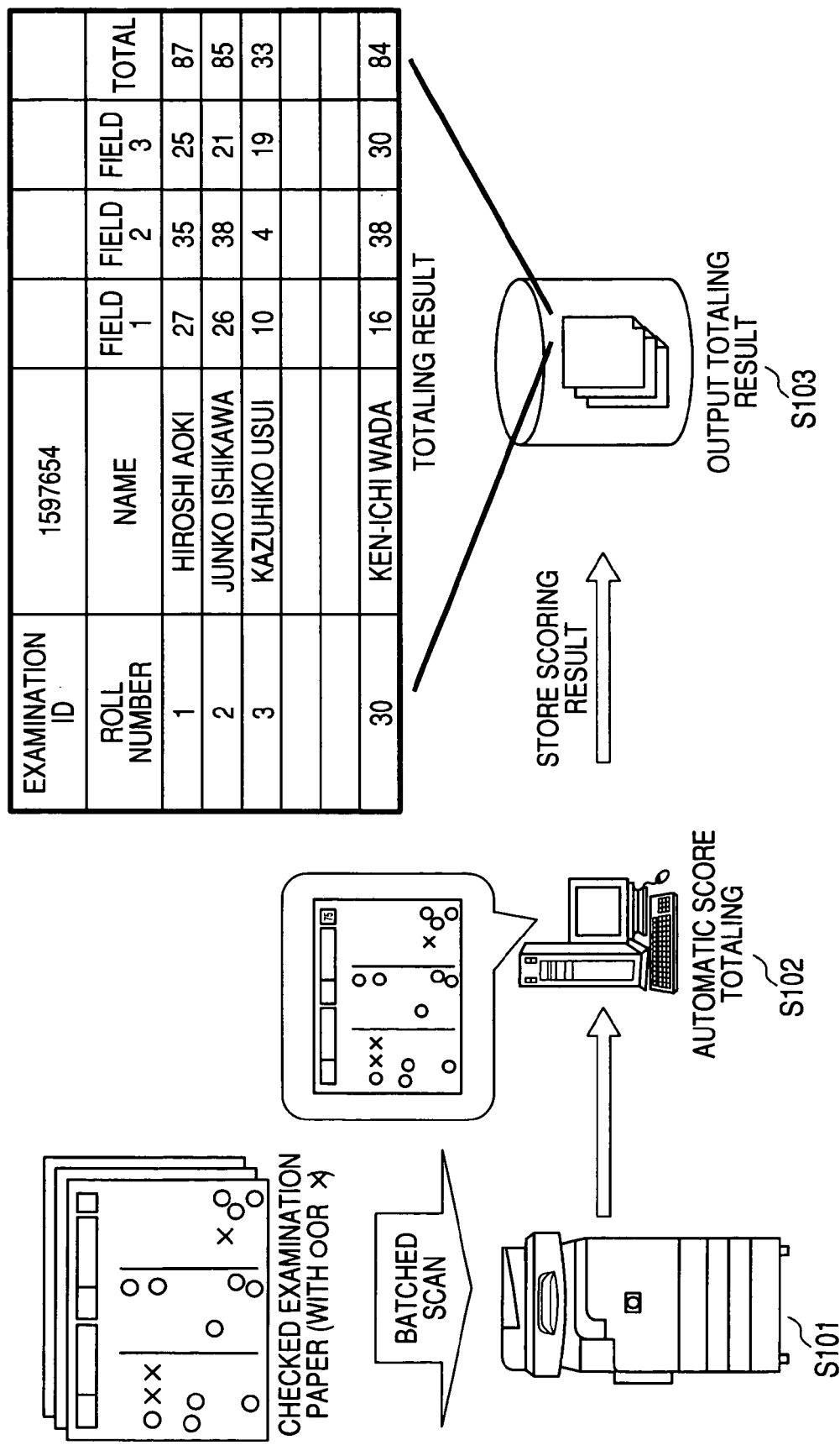
FIG. 5 is an explanatory view showing an exemplary processing operation of score totaling processing in the teaching material processing apparatus according to an embodiment of the invention.

Now, an exemplary processing operation in the teaching material processing apparatus configured as described above (including the case where it is realized by a teaching material processing program), that is, the procedure of the teaching material processing method according to an embodiment of this invention will be described. FIG. 5 is an explanatory view showing an exemplary processing operation in the teaching material processing apparatus according to an embodiment of this invention.

When the teaching material processing apparatus is used, electronic data about the original of the teaching material for education 20 that is a subject of score totaling processing is held and accumulated in the database unit 1 in advance, and the electronic data includes examination paper information including point allotment information of the teaching material for education 20. The electronic data and the examination paper information including point allotment information may be registered into the database unit 1 in advance, utilizing image reading by the image reader unit 2, layout (column composition) analysis by the image data analyzing unit 3 and the like. The image reading, layout analysis and the like can be performed by using known techniques and therefore will not be described in detail here.

In the score totaling processing, first, the image reader unit 2 performs image reading of a teaching material for education 20 on which a student or the like has written his or her name in the answerer information space 23 and his or her answers in the answer spaces 21 and on which a teacher or the like has written patterns indicating his or her judgments like "O" or "x" on the answers written in the answer spaces 21, and the image reader unit 2 thus acquires image data from the teaching material for education 20 (step 101; hereinafter "step" is simply referred to as "S"). At this point, when an ADF is used, batched image reading can be performed on plural teaching materials for education 20 that should be processed in a group such as a class, and the image data can be continuously acquired from each teaching material for education 20. The image data acquired by the image reading are temporarily held in a memory used as a work area.

After that, on the image data acquired from each teaching material for education 20, automatic scoring processing is sequentially performed as follows (S102).

Specifically, on the image data acquired from a certain teaching material for education 20, the image data analyzing unit 3 performs analysis processing and the teaching material distinguishing unit 4 identifies and specifies the teaching material for education 20 on the basis of the result of the analysis. This identification and specification may be done by title analysis of titles such as "Science", "5$^{th}$ grade" and "1. Changes in weather and temperature" or by code analysis of code information embedded in the teaching material distinguishing unit 4. By performing this identification and specification, the teaching material distinguishing unit 4 can specify the electronic data that is a comparison target with the image data acquired by the image reader unit 2. This identification and specification may be sequentially performed on each of the plural teaching materials for education 20 on which the image reader unit 2 has performed image reading. However, since all the teaching materials for education 20 that are processed in a group are generally the same, the identification and specification need be performed only on the first teaching material for education 20 of those processed in a group.

As the teaching material distinguishing unit 4 specifies the electronic data, the database unit 1 retrieves the corresponding electronic data from the data held and accumulated therein, in accordance with the result of the specification, and sends the retrieved electronic data to the difference extracting unit 6.

Meanwhile, on the image data acquired from a certain teaching material for education 20, the distortion correcting unit 5 corrects image distortion in the image data. This correction of image distortion is performed in order to correct image distortion that can occur in the image reading by the image reader unit 2, and in order to improve the accuracy of the subsequent comparison with electronic data, difference extraction and the like.

The difference extracting unit 6 compares the electronic data received from the database unit 1 with the image data that is acquired by the image reader unit 2 and in which image distortion has been corrected by the distortion correcting unit 5, and thus extracts the difference between them. By this difference extraction, the content of the writing in the answerer information space 23 and each answer space 21 and the content of the written judgment for each answer space 21 are extracted.

After the difference extracting unit 6 extracts the difference, the answerer extracting unit 7 extracts answerer information on the teaching material for education that is the reading subject at the image reading unit 2, through character recognition processing or the like with respect to the difference. Thus, it is possible to specify the class, roll number, name and the like of the person who has written answers on a certain teaching material for education 20.

Also, from the result of the difference extraction by the difference extracting unit 6, the judgment extracting unit 8 further extracts the result of the difference extraction with respect to a predetermined color component, specifically, for example, with respect to a red component, in order to extract the content of the written judgment for each answer space 21.

In the extraction of a predetermined color component, for example, when the result of the difference extraction includes pixel data, the extraction can be performed by paying attention to the color component data constituting the pixel data.

Generally, however, the writing of the pattern indicating judgment such as "O" or "x" on the teaching material for education 20 often overlaps the question text, the frame specifying each answer space 21, the content of the written answer in each answer space 21 and the like. Therefore, in the result of the extraction of a predetermined color component by the judgment extracting unit 8, the overlap part can be eliminated, that is, a missing part can exists in the pattern such as "O" or "x". Therefore, the missing part correcting unit 9 performs missing part correction processing on the result of the extraction of the predetermined color component by the judgment extracting unit 8.

The missing part correction processing by the missing part correcting unit 9 will now be described in detail.

Figure 6A:
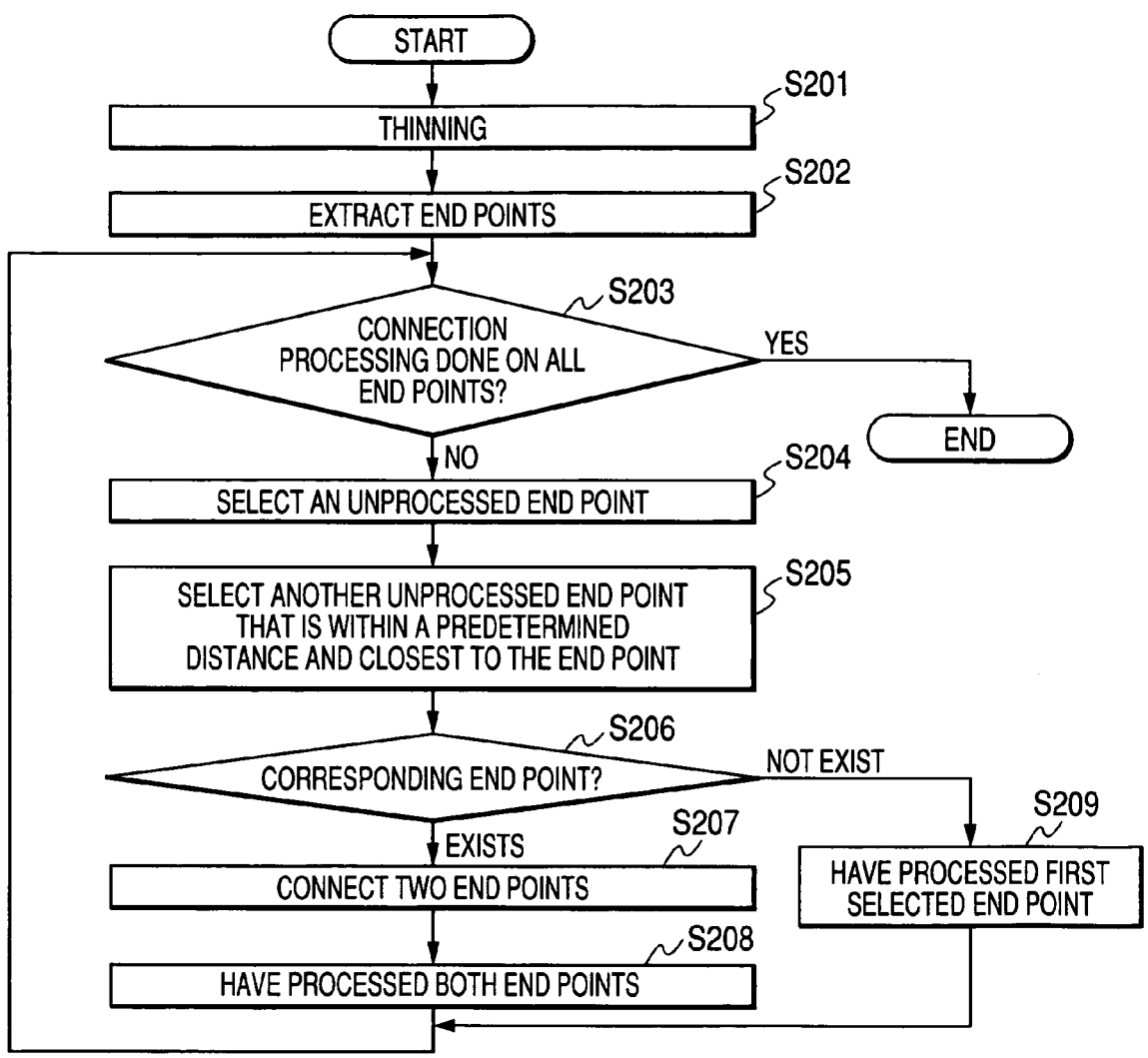
FIGS. 6A and 6B are explanatory views showing an example of missing part correction processing.
Figure 6B:
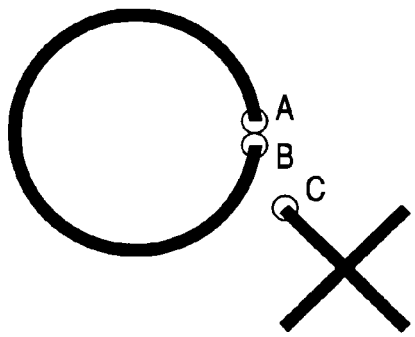

FIGS. 6A and 6B are explanatory views showing an example of missing part correction processing.

In the missing part correction processing, with respect to the result of the extraction of the predetermined color component by the judgment extracting unit 8, that is, the result of the extraction that should be a pattern such as "O" or "x", thinning processing is executed (S201) and end point extraction processing is further executed (S202), as shown in FIG. 6A. Thus, when the pattern such as "O" or "x" has a missing part, the end points of the missing part are extracted. The thinning processing and the end point extraction processing in this case may be performed by using known techniques and therefore will not be described in detail here.

When the end points are extracted, the processing as follows is executed on all the extracted end points (S203). Specifically, first, one of unprocessed end points is selected (S204) and another unprocessed endpoint (hereinafter referred to as "second end point") that is within a predetermined distance from the selected end point (hereinafter referred to as "first end point") and that is closest to the first end point is selected (S205). When there is a second end point (S206), the first end point and the second end point are connected with each other (S207) and both the first and second end points have been processed (S208). On the other hand, when there is no second point (S206), the first end point has been processed without carrying out connection of end points (S209). Such processing is performed on all the end points until there is no unprocessed end point (S203 to S209).

Thus, for example, when the patterns shown in FIG. 6B are extracted, even if end points B and C exist within a predetermined distance from an end point A, the end point B that is closest to the end point A is connected to the end point A and the missing part in the pattern "O" is corrected.

Figure 7A:
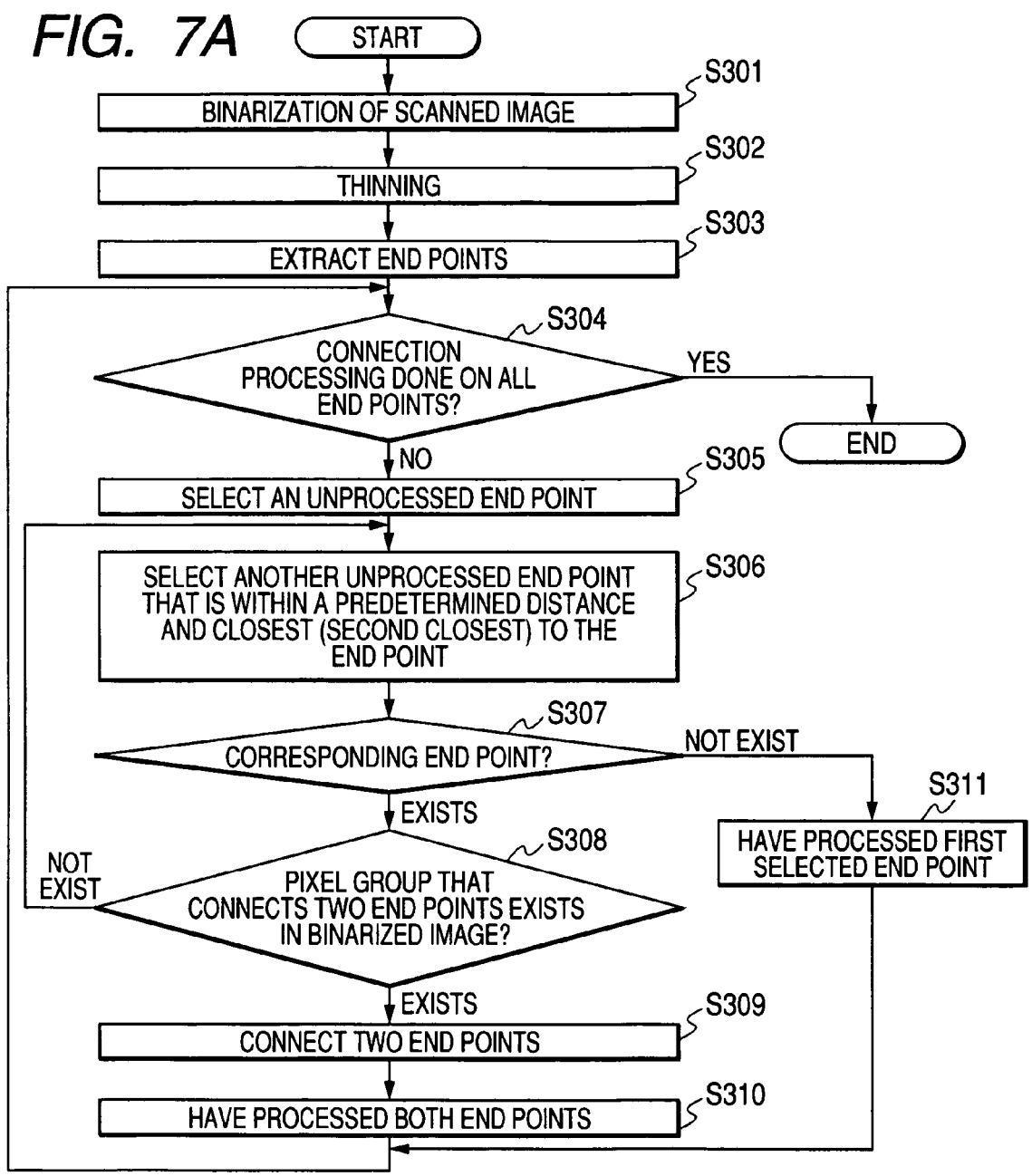
FIGS. 7A and 7B are explanatory views showing another example of missing part correction processing.
Figure 7B:
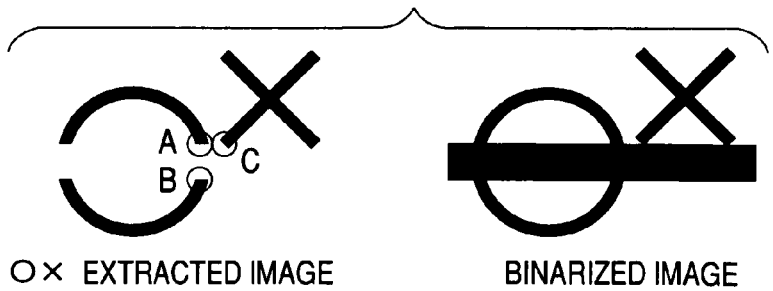

FIGS. 7A and 7B are explanatory views showing another example of missing part correction processing.

In this alternative example of the missing part correction processing, the accuracy of the missing part correction processing is improved by using the image data in which image distortion has been corrected by the distortion correcting unit 5 in addition to the result of the extraction of the predetermined color component by the judgment extracting unit 8. Specifically, in the alternative example of missing part correction processing, binarization processing is performed (S301) on the image data in which image distortion has been corrected by the distortion correcting unit 5, as shown in FIG. 7A. However, when binarization processing is performed in the difference extraction by the difference extracting unit 6 or in the extraction of the predetermined color component by the judgment extracting unit 8, the binarized image data may be used.

With respect to the result of the extraction of the predetermined color component by the judgment extracting unit 8, thinning processing is executed (S302) and end point extraction processing is further executed (S303). When end points are extracted, processing as follows is executed on all the extracted end points (S304).

First, an unprocessed end point is selected (S305), and another unprocessed end point that is within a predetermined distance from the selected first end point and that is closest to the first endpoint is selected as a second endpoint (S306). When there is a second end point (S307), it is judged whether a pixel group that connects the first end point with the second end point exists in the binarized image data or not (S308). In short, it is judged whether image overlap part exists or not, which is a cause of occurrence of the missing part. When there is an overlap part as a result of this judgment, the first end point and the second end point are connected with each other (S309) and both the first and second end points have been processed (S310). On the other hand, when there is no overlap part, the processing returns to the above-described step (S306) and an end point that is within the predetermined distance from the first end point and that is the second nearest to the first end point is selected as a second end point. At this point, when there is no end point that should be selected, the first end point has been processed without carrying out connection of end points (S311). Such processing is performed on all the end points until there is no unprocessed end point (S304 to S311).

Thus, for example, when patterns shown in FIG. 7B are extracted and end points B and C exist within a predetermined distance from an end point A, the end point C that is closest to the end point A is selected. However, since there is no pixel group that connects the end points A and C in the binarized image data, the end points A and C are not connected to each other. Then, the end point B that is the closest end point next to the end point C is selected. Since a pixel group that connects the end points A and B exists in the binarized image data, the end points A and B are connected to each other. In short, erroneous connection of "O" and "x" is avoided and the missing part in the pattern "O" is corrected.

After the missing part correction processing by the missing part correcting unit 9 as described above, the pattern recognition unit 10 performs shape recognition of the content of the written judgment, that is, pattern matching with the pattern "O" or "x" and recognizes whether the content of the written judgment is "right" or "wrong". The pattern matching in this case can be realized by using a known technique and therefore will not be described here.

After the pattern recognition unit 10 performs shape recognition of the content of the written judgment, the position correspondence unit 11 orders the content of the written judgment as the result of the recognition. For the ordering, for example, numbers may be appended in order of appearance when the teaching material for education 20 is scanned from its upper side. That is, since question numbers are generally appended to plural questions on the teaching material for education 20, the correspondence between the content of the written judgment and the answer space 21 can be made using the question numbers and the numbers in order of appearance of the writing of judgment. In the ordering by the position correspondence unit 11, since a group of continuous pixels constituting the pattern "O" or "x" is collectively handled, a rectangular area circumscribing the group of continuous pixels is extracted and labeling processing, which is a typical image processing technique, is performed to append an identifier to the circumscribing rectangular area. Thus, also in the position recognition by the position correspondence unit 11, the result of the labeling processing is utilized to collectively handle the group of continuous pixels (area) constituting the pattern "O" or "x".

Now, the processing to order the content of the written judgment by the position correspondence unit 11 will be described in detail. FIGS. 8A to 8C, FIGS. 9A and 9B and FIGS. 10A and 10B are explanatory views showing an exemplary processing procedure to order the content of the written judgment.

In the ordering processing, the position correspondence unit 11 first reads out examination paper information from the database unit 1, distinguishes the presence of column composition, the direction (vertical or horizontal) of texts and the like of the teaching material for education 20, which is a processing subject, and thus recognizes the direction of ordering. That is, the layout of the answer spaces 21 on the teaching material for education 20 is distinguished, and the ordering in the mode corresponding to the distinguished layout is performed, as will be described hereinafter.

Specifically, for example, when the teaching material for education 20 has a three-column composition of horizontal writing as shown in FIGS. 4A and 4B, the image data of the three-column composition are changed to a one-column composition on a memory used as a work area on the basis of the column composition information, as shown in FIGS. 8A to 8C.

Figures 9A, 9B:
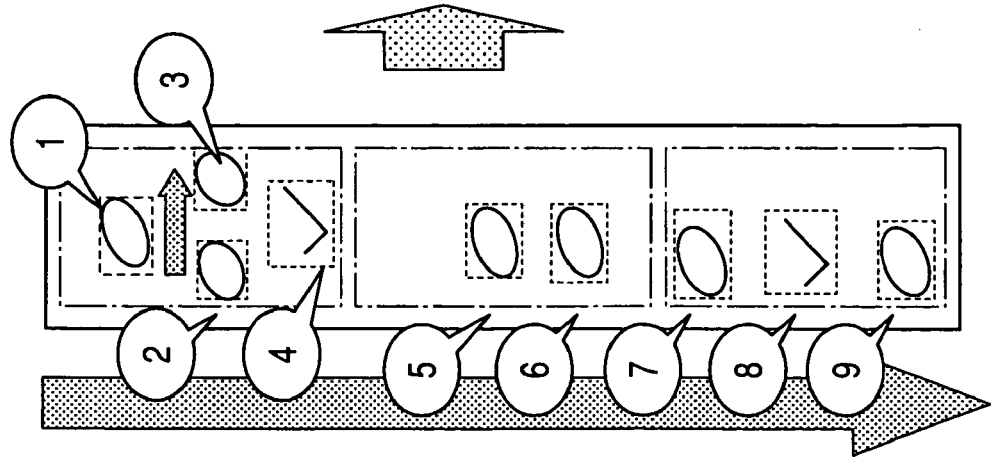
FIGS. 9A and 9B are explanatory views showing an example of ordering processing to order the contents of written judgments (part 2)

Then, the position correspondence unit 11 sequentially scans the image data of the one-column composition after the change, from a predetermined position (for example, upper end or right end), and appends numbers to pattern areas of "O" or "x" in order of their appearances, as shown in FIGS. 9A and 9B. Here, for example, when the image data is sequentially scanned from its upper end and pattern areas of "O" or "x" are found in the same row, the direction (horizontal or vertical) of writing of the examination paper information is recognized and the pattern areas are ordered from left to right (or from top to bottom).

The position correspondence unit 11 performs such ordering of all the pattern areas "O" or "x" existing on the teaching material for education 20, and registers the result of the ordering into the database unit 1. This registration may be carried out by associating the result of the ordering as a part of the examination paper information with each question in the examination paper information, as shown in FIGS. 10A and 10B. Thus, each question (answer space 21 for each question) on the teaching material for education 20, the content of the written judgment ("O" or "x") on the answer written in the answer space 21, and the allotment of points to each answer space 21 are caused to correspond to each other through the ordering of the content of the written judgment.

After the position correspondence unit 11 orders the content of the written judgment and makes the correspondence between the content of the written judgment and each question, the score totaling unit 12 performs score totaling of the judgment. At this point, when the judgment pattern is "O", the score totaling unit 12 adds the allotted points specified from the point allotment information with respect to the corresponding question. When the judgment pattern is "x", the score totaling unit 12 does not add the allotted points with respect to the corresponding question. The score totaling unit 12 performs such score totaling on the contents of all the written judgment on the teaching material for education 20.

Through the processing as described above, the result of the score totaling of the judgment written on the teaching material for education 20 is outputted from the score totaling unit 12 as the result of scoring by question. FIG. 11 is an explanatory view showing a specific example of the result of scoring by question. The result of scoring by question is information including numbers of questions existing on the teaching material for education 20, judgments on answers to the questions, and scores based on the judgments. As shown in FIG. 11, this information is outputted from the score totaling unit 12 in a table format in which the question numbers, judgments and scores are associated with each other.

After the result of scoring by question is outputted from the score totaling unit 12, the totaling result output unit 13 outputs the result of scoring by question, that is, the result of the score totaling by the score totaling unit 12, in association with the answerer information extracted by the answerer extracting unit 7, to the database device 31 or the file server device 32 connected with the teaching material processing apparatus (S103 in FIG. 5). Thus, the database device 31 or the file server device 32 can manage or use the result of score totaling on the teaching material for education 20, for example, in a list format.

As is described above, in the teaching material processing apparatus, the teaching material processing method and the storage medium storing the teaching material processing program in this embodiment, the image data read from the teaching material for education 20 on which judgments have been written is compared with the electronic data about the teaching material for education 20, that is, the data of the original on which answers in the answer spaces 20 and judgments on the answers have not been written, and the contents of written judgments is recognized from the difference between them to perform score totaling of the judgments. Therefore, when the image reading is performed on the teaching material for education 20 on which judgments have been written, automatic totaling of the result of scoring is performed with respect to the written judgments. As a result, labor saving is realized in the scoring processing on the teaching material for education 20. Moreover, since the processing is based on the image data read from the teaching material for education 20, the apparatus configuration can be realized, for example, by having the scanning function realized by a copy machine, multifunction machine or scanner device, and the information storage processing function, image processing function and arithmetic processing function of a computer device such as PC, and therefore dedicated devices need not be provided. Also, since the image data read from the teaching material for education 20 is compared with the electronic data held in the database unit 1, it is possible to secure sufficient versatility of applicable teaching materials by holding and accumulating electronic data about various types of teaching materials for education 20 in the database unit 1.

Moreover, in the teaching material processing apparatus, the teaching material processing method and the storage medium storing the teaching material processing program according to this embodiment, the contents of the written judgments are ordered and correspondence between the contents of the written judgments and each question is made. Therefore, for example, even when plural questions and answer spaces 21 for these questions are arranged on the teaching material for education 20 and the allotment of points is different among the questions, the correspondence between the content of each written judgment and the allotment of points thereto can be clarified on the basis of the result of the correspondence based on the ordering. Thus, the score totaling unit 13 can securely perform score totaling with respect to the judgment. In addition, since the result of recognizing the contents of the written judgment is ordered and caused to correspond to each question, the processing to input coordinate values on each teaching material for education, the processing to automatically calculate the coordinate values and the like are not necessary.

In short, according to the teaching material processing apparatus, the teaching material processing method and the storage medium storing the teaching material processing program in this embodiment, since automatic score totaling of the contents of the written judgment on the teaching material for education 20 used at educational institutions can be performed while eliminating the need to input information or the like, labor saving in the score processing can be realized. Therefore, the teaching material processing apparatus, the teaching material processing method and the storage medium storing the teaching material processing program are very convenient when used at educational institutions, and enable highly reliable and smooth scoring processing.

While a specific example of this invention is described in this embodiment, the invention is not limited to this description. For example, the above-described distortion correction processing, missing part correction processing and the like are not necessarily essential.

In this embodiment, the layout of the answer spaces 21 on the teaching material for education 20 is distinguished on the basis of the examination paper information held and accumulated in the database unit 1, and ordering is performed in the mode corresponding to the distinguished layout, thereby enabling ordering of the content of written judgment on the teaching material for education 20 having any layout, and thus securing versatility, flexibility and the like of the teaching material for education 20 that can be a processing subject. However, for example, when the type of teaching material for education and the layout of answer spaces are in a univocal relation, the mode of ordering may be decided on the basis of the information related to the type of the teaching material for education. Specifically, for example, if the material type of a teaching material for education is "arithmetic" or "science", ordering in a mode corresponding to a layout having three-column composition and horizontal writing is decided, as shown in FIG. 12A. If the material type of a teaching material for education is "Japanese" or "social studies", ordering in a mode corresponding to a layout having two-column composition and vertical writing is decided, as shown in FIG. 12B. The mode of ordering for other material types may be decided similarly. In this manner, by deciding the mode of ordering on the basis of the information related to the type of the teaching material for education, it is possible to reduce the quantity of examination paper information that is necessary for the decision. Also, when the layout of the answer spaces 21 on the teaching material for education 20 can be recognized from the result of the analysis by the image data analyzing unit 3, the mode of ordering may be decided on the basis of the result of the recognition. In this case, the ordering can be properly performed even when the examination paper information is not held and accumulated in the database unit 1.

Figure 13:
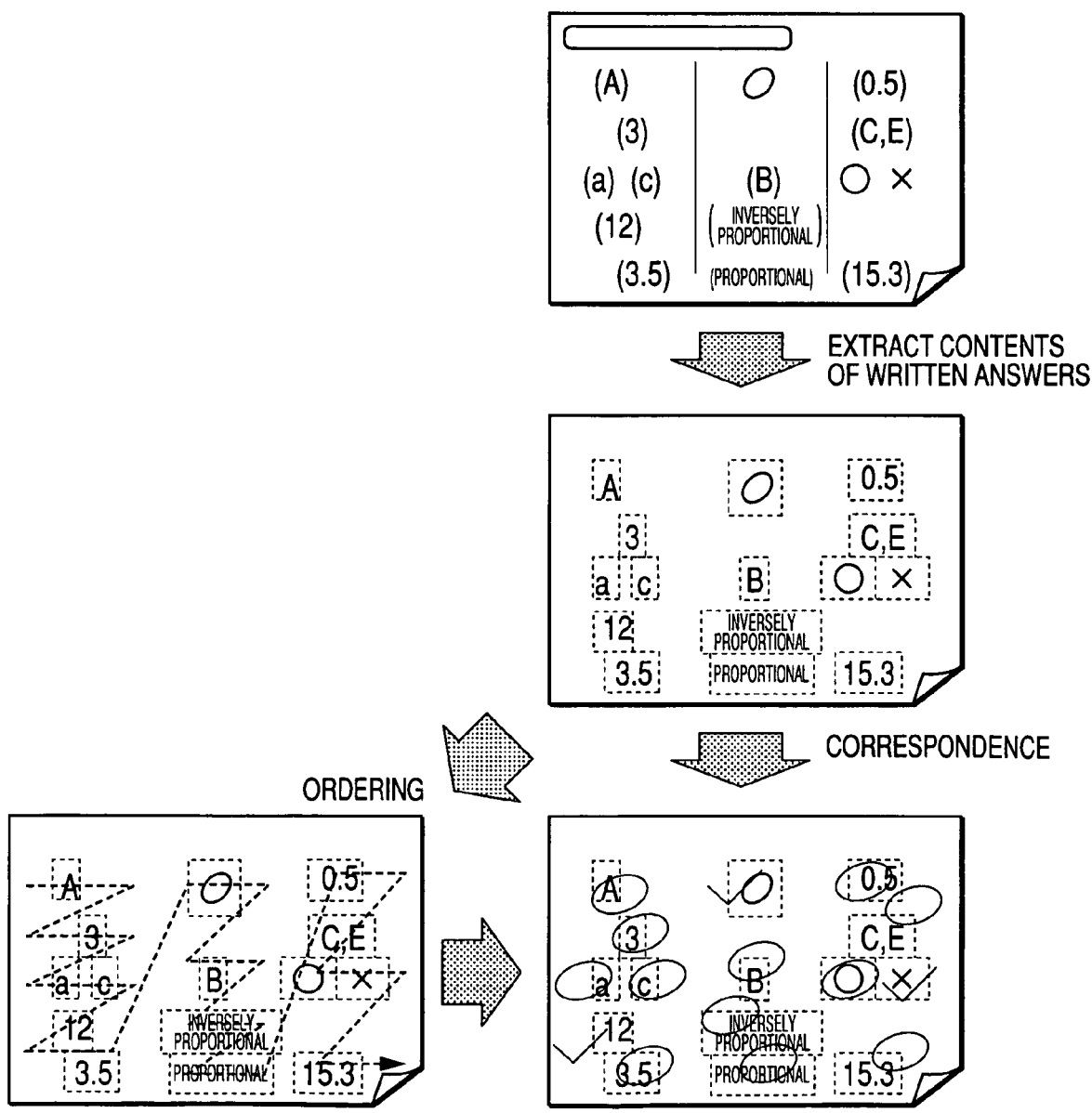
FIG. 13 is an explanatory view showing another example of ordering the contents of written judgments.

Also, while direct ordering of the contents of written judgments on the teaching material for education 20 is performed in this embodiment, the contents of written judgments can also be ordered indirectly via the answer spaces 21, as will be described hereinafter. Specifically, first, on the basis of the result of extracting the contents of writing in each answer space 21 of the result of difference extraction by the difference extracting unit 6, an area including the contents of the writing (for example, circumscribing rectangular area) is recognized, and each area is ordered in the same way as in the above-described example and correspondence between each area and the position where a judgment is written is made, as shown in FIG. 13. This correspondence may be made, for example, by calculating an overlap area of the area including the contents of writing in each answer space 21 and the rectangle circumscribing the judgment pattern and then making correspondence with the overlap area having a predetermined threshold value or more, or by making correspondence based on the distance between each area and the center coordinate, or by making correspondence simply based on whether there is an overlapped part or not. By thus ordering the area including the contents of writing in each answer space 21 and performing indirect ordering of the contents of written judgment, one can expect improvement in the processing accuracy of the ordering, compared with the direct ordering of the contents of the written judgment. This is because of the following reasons. Since a judgment is handwritten by a teacher or the like, the position where the judgment is written is not necessarily determined univocally in relation to each answer space 21, whereas the contents of writing in each answer space 21 is typically written within the area to be the answer space 21. In short, the position where an answer is written in each answer space 21 is less varied than the position where a judgment is written.

In this manner, various changes and modifications can be made to this embodiment without departing from the scope of this invention.

As described above, some embodiments of the invention are outlined below.

According to an aspect of the invention, a teaching material processing apparatus includes: a reader unit that performs image reading on a teaching material for education containing an answer space for each of plural questions, and acquires image data from the teaching material for education; an additionally written information extracting unit that compares image data acquired from a teaching material for education on which answers in the answer spaces and judgments on whether the answers are right or wrong are written, with image data of a teaching material for education on which the answer spaces are not filled, and thus extracts the difference between them; a judgment recognition unit that recognizes the contents of the written judgments from the result of the difference extraction by the additionally written information extracting unit; an additional writing order calculating unit that orders the contents of the written judgments, which are the result of the recognition by the judgment recognition unit, and makes correspondence between the result of the recognition and the plural questions; and a score totaling unit that performs score totaling of the judgment written on the teaching material for education on which image reading is performed by the reader unit, on the basis of the result of the recognition by the judgment recognition unit and the result of the correspondence by the additional writing order calculating unit.

According to an embodiment of the invention, the additional writing order calculating unit distinguishes layout of the answer spaces on the teaching material for education and performs ordering in a mode corresponding to the distinguished layout.

According to another embodiment of the invention, when the type of the teaching material for education and the layout of the answer spaces are in a univocal relation, the additional writing order calculating unit determines the mode of the ordering on the basis of information relates to the type of the teaching material for education.

According to another aspect of the invention, a teaching material processing method includes: performing image reading on a teaching material for education containing an answer space for each of plural questions, and acquiring image data from the teaching material for education; comparing image data acquired from a teaching material for education on which answers in the answer spaces and judgments on whether the answers are right or wrong are written, with image data of a teaching material for education on which the answer spaces are not filled, and thus extracting the difference between them; recognizing the contents of the written judgments from the result of the difference extraction; ordering the contents of the written judgments, which are the result of the recognition, and making correspondence between the result of the recognition and the plural questions; and performing score totaling of the judgment written on the teaching material for education on which image reading is performed, on the basis of the result of the recognition and the result of the correspondence.

According to another aspect of the invention, a storage medium storing a teaching material processing program causes a computer connected to a reader unit that performs image reading on a teaching material for education containing an answer space for each of plural questions and acquires image data from the teaching material for education, to function as; an additionally written information extracting unit that compares image data acquired from a teaching material for education on which answers in the answer spaces and judgments on whether the answers are right or wrong are written, with image data of a teaching material for education on which the answer spaces are not filled, and thus extracts the difference between them; a judgment recognition unit that recognizes the contents of the written judgments from the result of the difference extraction by the additionally written information extracting unit; an additional writing order calculating unit that orders the contents of the written judgments, which are the result of the recognition by the judgment recognition unit, and makes correspondence between the result of the recognition and the plural questions; and a score totaling unit that performs score totaling of the judgment written on the teaching material for education on which image reading is performed by the reader unit, on the basis of the result of the recognition by the judgment recognition unit and the result of the correspondence by the additional writing order calculating unit.

In the teaching material processing apparatus of the above-described configuration, the teaching material processing method of the above-described procedure, and the storage medium storing the teaching material processing program of the above-described configuration, the contents of the written judgments are recognized from the difference between the image data acquired from a teaching material for education on which answers in the answer spaces and judgments on whether the answers are right or wrong are written and image data of a teaching material for education on which the answer spaces are not filled. Then, the contents of the written judgments, which are the result of the recognition, are ordered, and correspondence between the result of the recognition and each question is made. The ordering may be done, for example, by appending numbers in order of appearance when the teaching material for education is scanned from its upper side. That is, since question numbers are generally appended to plural questions on a teaching material for education, the correspondence between the contents of the written judgments and each question may be made by using the question numbers and the numbers in order of appearance of the written judgments.

Thus, for example, even when plural questions and answer spaces for the questions are arranged on a teaching material for education and the allotment of points to each question differs, the correspondence between the contents of the written judgments and the questions is clarified and therefore score totaling of the judgments can be performed. Moreover, since the result of recognizing the contents of the written judgments is ordered and the correspondence with each question is made, the processing to input or automatically calculate coordinate values on each teaching material for education need not be performed.

As described above, in the teaching material processing apparatus, the teaching material processing method and the storage medium storing a teaching material processing program according to an aspect of the invention, for example, even when plural questions and answer spaces for the questions are arranged on a teaching material for education used at educational institutions and the allotment of points to each question differs, automatic score totaling of the contents of the written judgments can be performed and it does not require labor for inputting information, excessive processing load or the like. Therefore, labor saving in the scoring processing can be realized. Thus, the teaching material processing apparatus, the teaching material processing method and the storage medium storing a teaching material processing program are very convenient when used in educational institutions and enable smooth and highly reliable scoring processing.

Further, the embodiment of the invention has been described above, but the invention is not limited thereto.

Further, while the marking of test papers is done to enter the figure (O) for a correct answer and the figure(x) for an incorrect answer in the embodiment as above, another figures may be used. For example, a check mark can be used for a correct answer. According to an aspect of the present invention, an example of the teaching material has been explained. However, the material is not limited to the teaching material.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-052481 filed on Feb. 28, 2005 including specification, claims, drawings and abstract is incorporated herein by reference in its entirety.

What is claimed is:

1. A material processing apparatus comprising:
   a reader unit that reads a material that includes first information written by a first user and second information written by a second user, the second information including an affirmative figure and a negative figure evaluating the first information written by the first user, the first information being a plurality of answers written by the first user, the affirmative figure being a figure indicating that an answer is correct, the negative figure being a figure indicating that an answer is incorrect, the affirmative figure and the negative figure being different in shape;
   a judgment recognition unit that recognizes the affirmative figure and the negative figure from the material read by the reader unit by performing shape recognition on the second information;
   an order calculating unit that determines an order of the affirmative figure and the negative figure in accordance with positions of the affirmative figure and the negative figure on the material; and
   a grade determination unit that grades the material based on the order determined by the order calculating unit.

2. The material processing apparatus according to claim 1, further comprising:
   a score totaling unit that scores the material based on grades for the material produced by the grade determination unit.

3. The material processing apparatus according to claim 1, wherein the material is a teaching material for education, the teaching material has an answer space for each of a plurality of questions.

4. The material processing apparatus according to claim 1, further comprising an information extracting unit that compares image data of the material which has the first information written by the first user and the second information with image data of a material which has no information written by the first user or the second user.

5. The material processing apparatus according to claim 1, wherein the grade determination unit grades the first information by analyzing the contents of the first information written by the first user.

6. The material processing apparatus according to claim 1, wherein the second user is a teacher, instructor, or evaluator.

7. A material processing method which, when executed by a computer, causes the computer to perform the steps of:
   reading a material that includes first information written by a first user and second information written by a second user, the second information including an affirmative figure and a negative figure that evaluates the first information, the first information being a plurality of answers written by the first user, the affirmative figure being a figure indicating that an answer is correct, the negative figure being a figure indicating that an answer is incorrect, the affirmative figure and the negative figure being different in shape;
   recognizing the affirmative figure and the negative figure from the material read in the step of reading by performing shape recognition on the second information;
   determining an order of the affirmative figure and the negative figure in accordance with positions of the affirmative figure and the negative figure on the material; and
   grading the material based on the order determined in the step of determining,
   wherein reading a material is performed with a processor.

8. The material processing method according to claim 6, further comprising:
   scoring the material based on grades of the material produced in the step of grading.

9. The material processing method according to claim 7, wherein the material is a teaching material for education, the teaching material has an answer space for each of a plurality of questions.

10. The material processing method according to claim 7, further comprising extracting information by comparing image data of the material which has the first information written by the first user and the second information with image data of a material which has no information written by the first user or the second user.

11. The material processing method according to claim 7, wherein the first information is graded by analyzing the contents of the first information written by the first user.

12. A storage medium readable by a computer, the storage medium storing a program of instructions executable by the computer to perform a function for processing a material, the function comprising:

reading a material including first information written by a first user and second information written by a second user, the second information including an affirmative figure and a negative figure that evaluates the first information, the first information being a plurality of answers written by the first user, the affirmative figure being a figure indicating that an answer is correct, the negative figure being a figure indicating that an answer is incorrect, the affirmative figure and the negative figure being different in shape;

recognizing the affirmative figure and the negative figure from the material read in the step of reading by performing shape recognition on the second information;

determining an order of the affirmative figure and the negative figure in accordance with the positions of the affirmative figure and the negative figure on the material; and grading the material based on the order determined in the step of determining.

13. The storage medium according to claim 12, wherein the function further comprises:

scoring the material based on grades for the material produced in the step of grading.

14. The storage medium according to claim 12, wherein the material is a teaching material for education, the teaching material has an answer space for each of a plurality of questions.

15. The storage medium according to claim 12, wherein the function further comprises comparing image data of the material which has the first information written by the first user and the second information with image data of a material which has no information written by the first user.

16. The storage medium according to claim 12, wherein the first information is graded by analyzing the contents of the first information written by the first user.

17. A teaching material processing apparatus comprising:

a reader unit that performs image reading on a teaching material for education containing an answer space for each of a plurality of questions, answers written by a first person, and judgments written by a second person, the judgments including evaluations of the answers, and that acquires image data from the teaching material for education;

an additionally written information extracting unit that compares image data acquired from a teaching material for education on which the answers in the answer spaces and the judgments on whether the answers are right or wrong are written, with image data of a teaching material for education on which the answer spaces are not filled, and thus extracts the difference between them;

a judgment recognition unit that recognizes the contents of the written judgments from the result of the difference extraction by the additionally written information extracting unit;

an additional writing order calculating unit that orders the contents of the written judgments, which are the result of the recognition by the judgment recognition unit, and makes correspondence between the result of the recognition and the plurality of questions; and a score totaling unit that performs score totaling of the judgment written on the teaching material for education on which image reading is performed by the reader unit, on the basis of the result of the recognition by the judgment recognition unit and the result of the correspondence by the additional writing order calculating unit, wherein the recognizing the contents of the written judgments comprises recognizing patterns of the written judgments.

18. The teaching material processing apparatus according to claim 17, wherein the additional writing order calculating unit distinguishes layout of the answer spaces on the teaching material for education and performs ordering in a mode corresponding to the distinguished layout.

19. The teaching material processing apparatus according to claim 18, wherein when the type of the teaching material for education and the layout of the answer spaces are in a one-to-one relation, the additional writing order calculating unit determines the mode of the ordering on the basis of information related to the type of the teaching material for education.

* * * * *